Feb. 11, 1958 H. C. STEARNS 2,822,794
TEMPERATURE CONTROL APPARATUS
Filed April 25, 1956 3 Sheets-Sheet 1
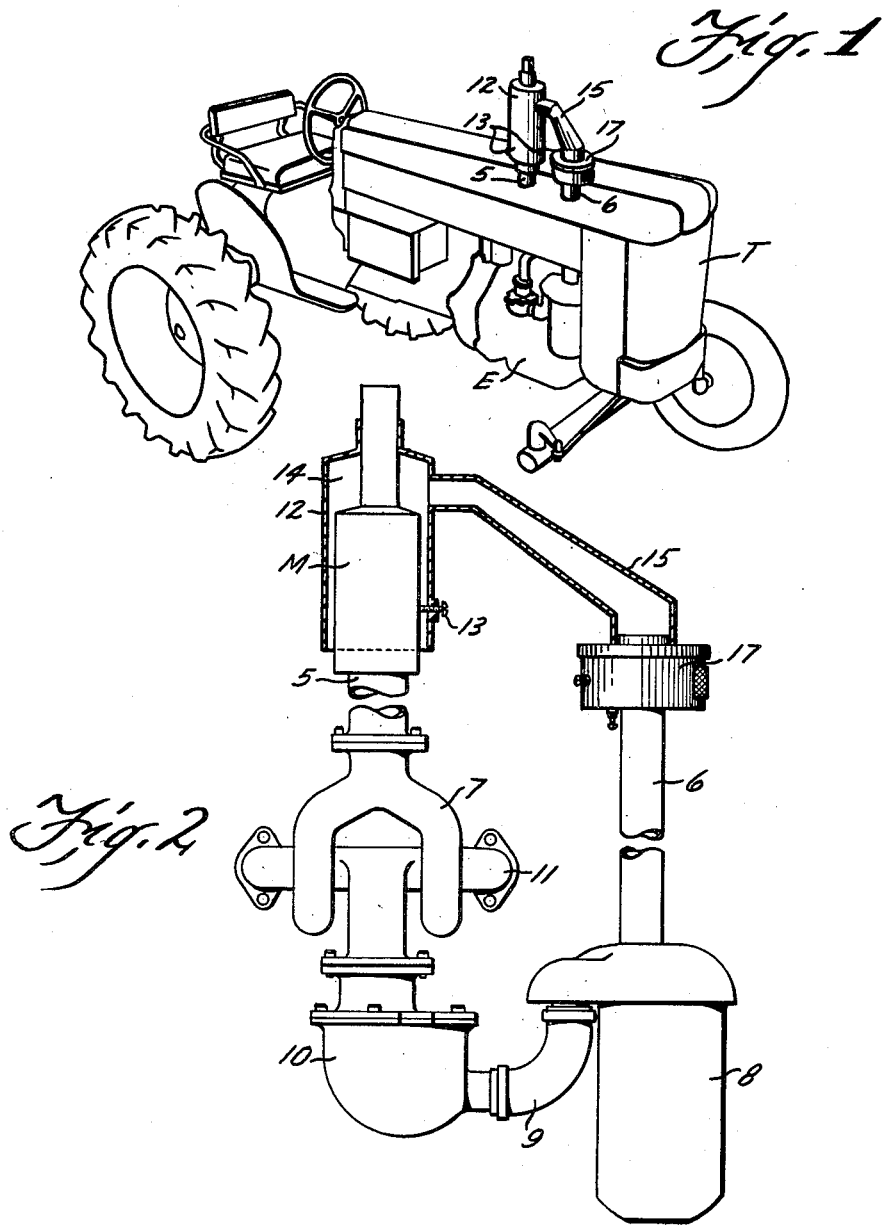
INVENTOR.
Harry C. Stearns
BY Charles & French
Attys.

Feb. 11, 1958                H. C. STEARNS                2,822,794
                       TEMPERATURE CONTROL APPARATUS
Filed April 25, 1956                                  3 Sheets-Sheet 2
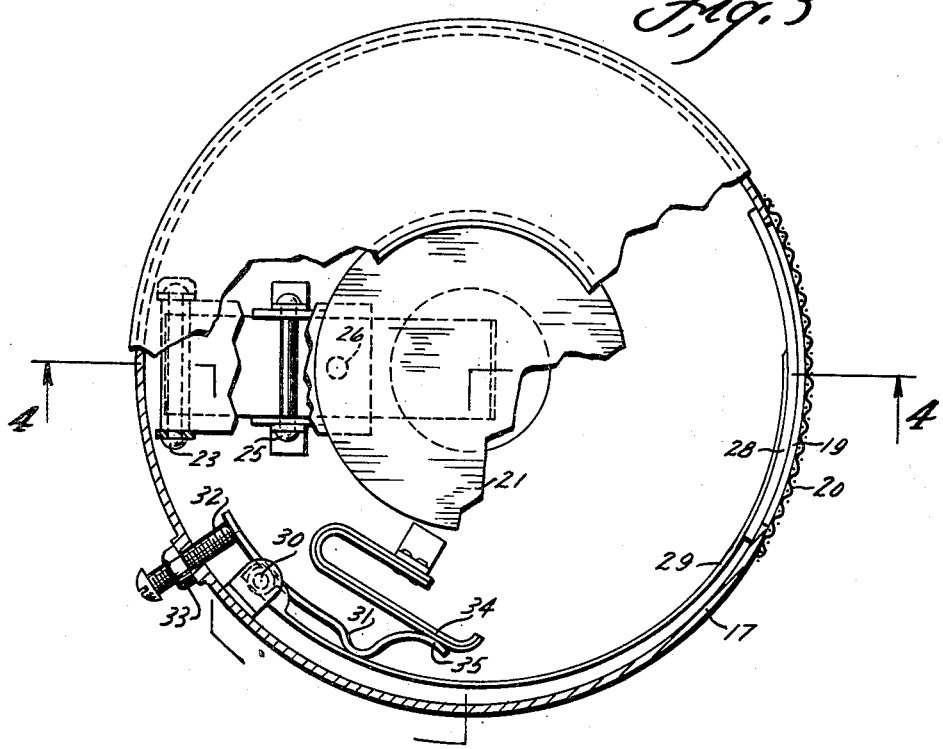
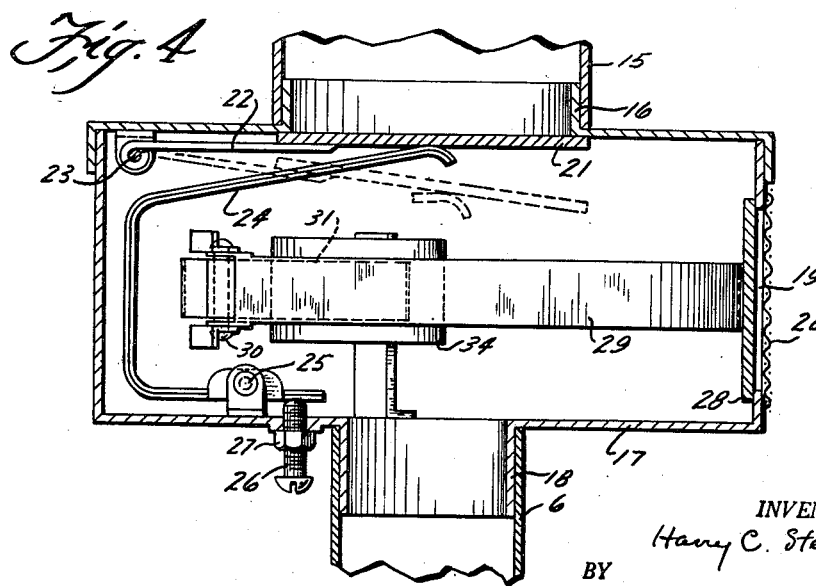
INVENTOR.
Harry C. Stearns
BY
Charles & French
Attys.

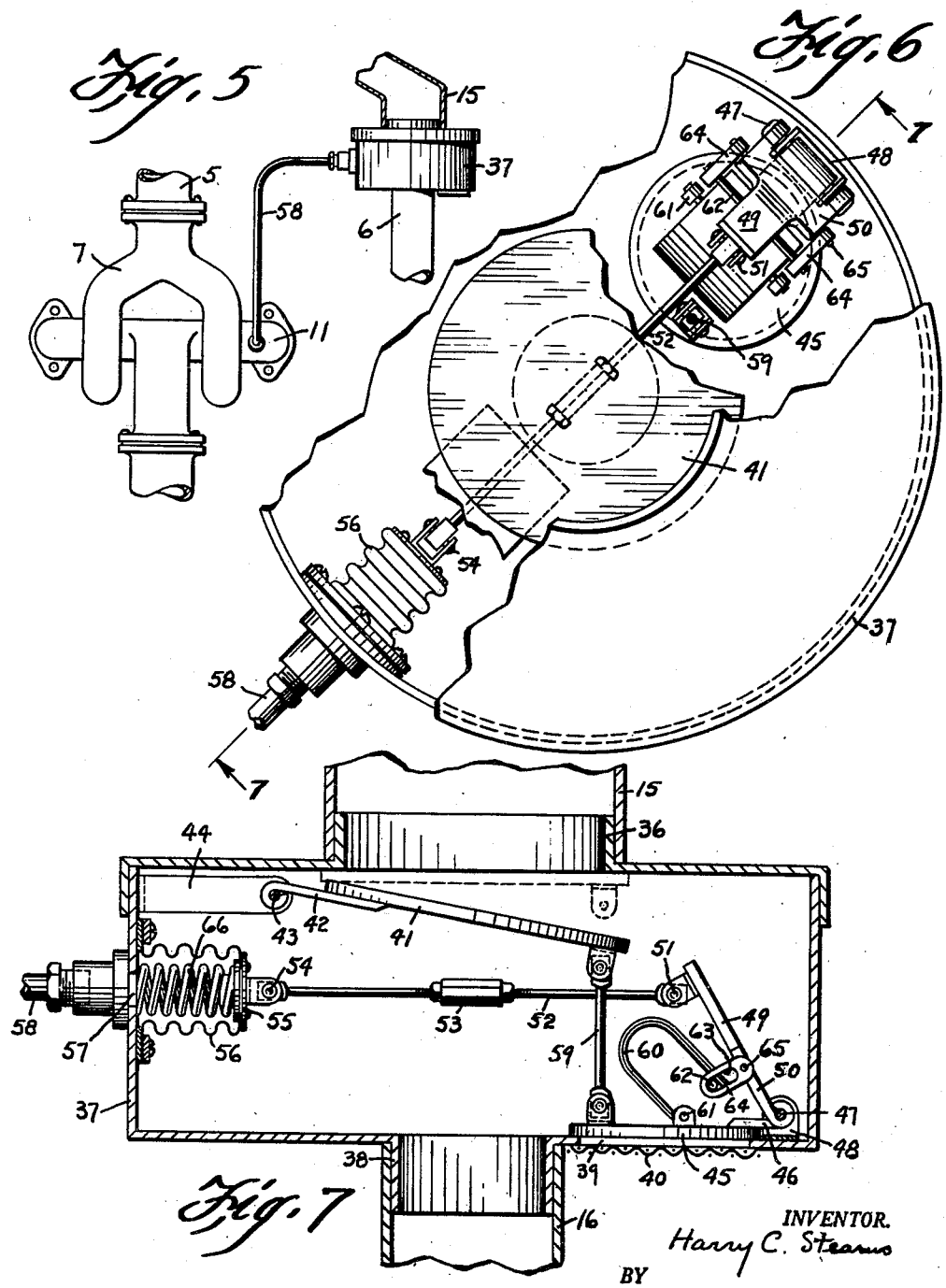

United States Patent Office 2,822,794
Patented Feb. 11, 1958

2,822,794

TEMPERATURE CONTROL APPARATUS

Harry C. Stearns, Glen Ellyn, Ill.

Application April 25, 1956, Serial No. 580,618

9 Claims. (Cl. 123—122)

The invention relates to temperature control apparatus for the intake air for internal combustion engines.

The main object of the invention is to prevent so-called icing occurring in the carburetor brought about by either cold air or air having a high dew point. Heretofore, special exhaust heated manifolds have been used to warm the intake air before its passage to the carburetor, but there are drawbacks to such arrangements as in extremely hot weather vapor lock is aggravated and also the heavy mass of the manifolds warm up slowly so that the necessary heat was not obtained soon enough to meet the requirements of the accumulating frost in the carburetor so that starving of the engine after starting was a typical result. According to the present invention prior difficulties have been overcome by taking heat from a thin walled exhaust pipe section or stove to secure a prompter heating of the air and automatically controlling the amount of this heated air by thermostatic valving to provide intake air of a temperature that will meet seasonal conditions.

A further object of the invention is to provide an inlet air control device including a pair of valves, one controlling the heated air and the other air at ambient temperature, these valves preferably being of a weight and mass such that they act like instantaneous chokes to take care of suddenly increased loads.

The invention further consists in the several features hereinafter set forth and more particularly defined by claims at the conclusion hereof.

In the drawings:

Fig. 1 is a perspective view of a tractor equipped with apparatus embodying the invention, parts being broken away;

Fig. 2 is a view partly in section of temperature control apparatus embodying the invention as installed on other engine parts;

Fig. 3 is a plan view of parts of the apparatus, parts being broken away and parts being shown in section;

Fig. 4 is a vertical sectional view taken on the line 4—4 of Fig. 3;

Fig. 5 is a view similar to Fig. 2 showing certain modifications, parts being broken away;

Fig. 6 is a plan view of the modified form of apparatus, parts being broken away and parts being shown in section;

Fig. 7 is a vertical sectional view taken on the line 7—7 of Fig. 6.

In Fig. 1 I have shown a tractor T having an engine E provided with an exhaust pipe 5 and an intake 6. In Fig. 2 the exhaust pipe 5 is shown as connecting with the exhaust manifold 7 for the engine and the intake pipe 6 connecting with an air cleaner 8 whose outlet is connected by a pipe 9 with the inlet to a carburetor 10 that is connected to the engine inlet manifold 11. The apparatus embodying the invention are parts adapted to be mounted and supported on the exhaust pipe and the intake pipe.

The exhaust pipe 5 is provided with the usual muffler M which as is well known is formed of fabricated sheet metal parts of thin walled section so that heat is rapidly dissipated therefrom. Over this muffler and the upper end of the exhaust pipe I mount a tubular housing 12 secured in position by equidistantly disposed set screws 13 or other suitable means engaging the muffler and spacing the sides of said housing and its top from the muffler and a portion of the pipe 5 to form a heating chamber 14.

From the housing 12, a pipe 15 leads to a flanged top opening 16 of a valve containing air inlet housing 17 which has a flanged bottom opening 18 fitting the upper end of the air intake pipe 6.

The housing 17 has a side opening 19 covered by a screen 20.

Under the suction action of the engine, air passes upwardly through the chamber 14 and pipe 15 to the housing 17 and thence through pipe 6, cleaner 8, pipe 9 to the carburetor 10 which delivers its fuel mixture to the intake manifold 11. In passing through the chamber 14 the air takes on heat given off by the exhaust heated muffler M so that it will be heated sufficiently so that a mixture with the fuel will be formed in the carburetor without danger of icing.

In order to control the temperature of the intake air to take care of seasonal changes, a flap valve 21, controlling passage of heated air through the opening 16, is mounted on a lever arm 22 pivoted on a shaft 23 mounted in the housing 17. This valve is opened or closed depending upon the temperature of the heated air under the control of a thermostatic means here shown as a bi-metallic element 24 in the form of a lever pivotally mounted intermediate its ends on a pin 25 mounted in the housing 17. The outer end of the longer arm of the lever is adapted to contact the valve and the shorter arm of the lever is adapted to be engaged by an adjusting screw 26 mounted in the housing 17 and provided with a lock nut 27, this screw acting to impart a variable initial tensioning contact between said element 24 and the valve 21, which is openable under the suction effect of the engine in varying amounts depending upon the effect of the incoming heated air on the thermostat 24, this member bending and tending to close the valve as the temperature of the exhaust heated air increases.

A curved flap valve 28 controls passage of unheated air through the opening 19 and is mounted on a lever arm 29 pivoted on a shaft 30 mounted in the side of the housing. This valve is normally urged to a closed position by a leaf spring 31, bearing thereon at one end, pivoted on the shaft 30 intermediate its ends, and adjustably engaged at its other end to vary its pressure on the arm 29 by load adjusting screw 32 mounted in the housing 17 and secured in set position by a lock nut 33. The supply of intake air controlled by this valve is supplemental to the supply of heated air controlled by the valve 21. As the bimetallic element 24 tends to close the valve 21, the suction effect of the engine acts to open the valve 28 so that a tempered mixture of warm and cooler air is supplied to the carburetor to meet operating conditions, but under some conditions it is desirable to control the maximum opening movement of the valve 28, and for this purpose a thermostatic means acting on the spring 31 is provided and is here shown as a bi-metallic element 34 of U-formation supported at one end from the housing and engageable at its other end with an extension 35 of the spring 31. The element 34 in bending under the action of the heated air passing through the housing augments the adjusted loading of the spring 31 on the valve 28 acting to tend to close the valve as the temperature of the air drops, it being noted that as the ambient temperature drops so will the temperature in the housing drop.

With the above construction, the valve 21 is controlled entirely by the temperature of the air entering the housing 17 and on starting of the engine opens up to the dotted line position shown in Fig. 4, and if the outside air is cold, it may stay in this position or be partly shut by the action of the thermostat 24 depending upon weather conditions, the air furnished to the engine through the opening 16 being sufficiently warm to improve vaporization in the carburetor and to prevent condensation on the cold wall of an unheated manifold. Then when the throttle is opened wide under heavy load, the thermostat adjustment should be such that the temperature of the inlet will prevent icing but not much above it to develop high volumetric efficiency. Preferably, the valve 21, under the action of the element 34, will not close off the opening 16 below a temperature of one hundred twenty degrees, Fahrenheit. In somewhat warmer weather this adjustment of the thermostat 24 closes the valve 21 somewhat and permits outside air to come into the housing 17 through the opening 19 as the valve 28 opens under suction so that a mixture of warm and cool air is furnished the engine, and in hot weather the valve 21 may be shut or nearly shut and the engine air taken in through the side opening 19. The by-pass valve or valve 28 is held closed by the spring 31 until about a quarter pound per square suction pressure drop causes it to open gradually to a full open position at three-enghths pound per square inch suction pressure to handle the full demand of the engine. When the air temperature is at seventy degrees Fahrenheit, the element 34 will begin to contact the spring 31 in the open position of the valve 28 and will have this valve well closed down, as shown in Fig. 3 when the outside air is at fifty degrees Fahrenheit. Thus when the ambient temperature is seventy degrees or higher, the valve 28 will function entirely by a pressure drop across it, and since the valve 21 will not close off below one hunderd twenty degrees Fahrenheit, at lower air demands as in idling or slightly above, the air taken through the carburetor will approach this upper value. Since the area of the by-pass port or opening 19 is considerably greater than the port or opening 16, although either is large enough to handle full engine demand without undue drop, on heavy air demands the flow will favor the port 19 when the ambient temperature is above seventy degrees.

It is to be noted that due to the inertia of the valves 21 or 28, when the engine load is increased suddenly with a greater demand for fuel, these valves are of a weight and mass to act like instantaneous chokes to cause a greater amount of fuel to be supplied to the engine momentarily.

Instead of a separate thermostat for each valve, the valves may be jointly controlled by a single thermostat, preferably subject to manifold pressure control as shown in Figs. 5 to 7.

Referring to Figs. 5 to 7, the flanged top opening 36 of a housing 37 connects with the pipe 15 and its flanged bottom opening 38 connects with the air intake pipe 6. The housing has a bottom opening 39 covered by a screen 40.

A flap valve 41 carried by an arm 42 pivotally mounted at 43 on a bracket 44 secured to the housing 37 controls the passage of heated air through the opening 36.

A flap valve 45 controls passage of unheated air through the opening 39 and has an arm 46 pivoted on a shaft 47 mounted in a bracket 48 carried by the bottom of the housing.

A lever 49 has a forked lower end 50 pivoted on said shaft 47 and at its upper end is pivotally connected at 51 to one end of a lengthwise adjustable rod 52 having sections connected by an adjustable turnbuckle 53. The other end of the rod 52 is pivotally connected at 54 to head end 55 of a flexible metal bellows 56 whose other end is anchored against a side portion of the housing 37. A port 57 in the housing connects the interior of the bellows with a pipe 58 leading to the engine manifold 11.

The valves 41 and 45 are connected together by a link 59 pivotally connected at its ends to said valves.

A bimetallic element 60 of looped form has one end 61 pivotally anchored to the valve 45 and its other end carries a transversely extending pin 62 whose extensions work in the slots 63 of a pair of oppositely disposed links 64 pivotally carried by a pin 65 mounted intermediate the ends of the lever 49. The metal of the element 60 having the higher coefficient of expansion is on the outside of the loop.

The element 60 is so arranged that at any temperature below 50° F. it will expand and close the cold air valve 45. In so doing, the valve 41 admitting warm air is held open. This condition prevails regardless of the slots 63 and the position of anchorage of the lost motion links 64 due to changes in manifold pressure. This position is not shown in the drawings, but in this position the pin 62 is at the ends of the slots 63 near the points of anchorages of the links 64.

As the temperature of the intake air rises above 50° F. because of heat imparted to it by the exhaust as previously described, the element 60 first becomes ineffective to close the cold air inlet or tends to open the valve 45 when manifold pressures are high, but as soon as substantial manifold vacuum develops, the element 60 will let the cold air valve 45 close. As the temperature of the intake air rises, a higher and higher vacuum in the manifold 11 is required in order to close the valve 45, until finally a temperature is reached where the element 60 will have contracted sufficiently to open the valve 45 and close the warm air inlet valve 41 regardless of the amount of vacuum prevailing in the manifold.

It may be of advantage to so arrange the parts that the latter extreme cannot be reached and that some warm air will always be admitted even at high ambient temperatures whenever the manifold vacuum becomes very high. The purpose of such a relation of the valves 41 and 45 relative to each other is to bring to the throat of the carburetor even in hot weather under idling and low powered conditions a warm air mixture such as would produce a maximum vaporization of the fuel as distinguished from simple atomizing. This effect is sought because at low throttle settings, low power, or idling conditions atomization is erratic and incomplete, and there is a tendency for liquid fuel to accumulate in the corners of the inlet manifold and other places producing uneven running of the engine.

When properly adjusted, if for any reason the high temperature interferes with engine operation at low speed, manifold pressure will drop and the cold air valve 45 will be immediately opened to remedy this situation. On the other hand, with the engine running properly at low power on warm air, if a sudden demand is placed on the engine for power and the governor opens the throttle wide, the valve 45 will again be immediately opened since the vaporizing effect of the warm air stream is no longer of advantage due to the higher air velocity which is then adequate to atomize the fuel.

The bellows 56 is normally urged to an expanded position by a spring 66 when atmospheric pressure is prevailing in its interior. As manifold suction increases, the bellows contracts against the outward expansive force of the spring. The loading of spring 65 should be such that the normal travel of the bellows is complete over the normal range of manifold pressures. The effective length of the rod 52 is adjustable through the turnbuckle 53 so that the valves 41 and 45 will occupy the positions intended at the temperatures and manifold pressures which are desired.

In the device shown in Figs. 3 and 4 the valves 21 and 28 act to transfer from a cold to a hot air supply at an arbitrarily chosen temperature range, but even in cold weather, if there is sufficient suction, some cold air will be admitted to the housing 17. Even in warm weather if there is sufficient suction, some warm air will be drawn in. This is due to the fact that both valve 21 and 28 open inwardly against the resilient restraint of their bimetal elements. In the form of Figs. 5 to 7 the two valves 41 and 45 are counterbalanced against one another so far as suction effects are concerned, and because of this these valves are not responsive to suction except insofar as the bellows 56 alters the biasing effect of the element 60. Manifold pressures in this instance are taken beyond the carburetor rather than on the air inlet side, and this type of suction is not the same as the suction affecting the valves of the first form. Manifold suction may be very high at low throttle settings. The suction that affects the first form of device can be high only at large throttle openings with the engine turning at fairly rapid speed. The differences in performance are mainly due to this factor. It is important to bear in mind that devices of the type described are intended primarily for use on governed engines, and with such engines suction in the heat control device itself may be more closely related to power demand than manifold suction.

From the foregoing it will be noted that the valve arrangements herein protect against icing under all conditions and permit supplying a considerable elevated temperature to the air at partially open throttle.

I desire it to be understood that this invention is not to be limited to any particular form or arrangement of parts except insofar as such limitations are included in the claims.

What I claim as my invention is:

1. In a temperature control apparatus for the intake air of an internal combustion engine, the combination of a housing connected with the air intake of the engine, an exhaust heated air heater, distinct from the engine for supplying heated air to said housing, a valve controlling the passage of heated air to said housing, a passage in said housing open to atmosphere, a valve controlling air flow through said passage, and thermostatically controlled means for controlling the alternate opening and closing of said valves, each of said valves being operable by engine suction pressure as determined by the mixture demand of the engine.

2. In a temperature control apparatus for the intake air of an internal combustion engine, the combination of a housing connected with the air intake of the engine, an exhaust heated air heater distinct from the engine for supplying heated air to said housing, an inwardly opening flap valve controlling the passage of heated air to said housing, a passage in said housing open to atmosphere, an inwardly opening flap valve controlling air flow through said passage, and thermostatically controlled means for controlling the alternate opening and closing of said valves, each of said valves being operable by engine suction pressure as determined by the mixture demand of the engine.

3. In temperature control apparatus for the intake air of an internal combustion engine, the combination of a housing for mounting on the air intake of the engine, an exhaust heated air heater for supplying heated air to said housing, a valve controlling the passage of heated air to said housing, thermostatic means controlling the opening and closing of said valve, a passage in said housing open to atmosphere, a valve controlling air flow through said passage, spring means normally acting to close said last named valve but permitting opening thereof as said first named valve is closed, and a thermostatic means operable under lower ambient temperature conditions to augment the closing action of said spring means.

4. Temperature control apparatus as defined in claim 3, wherein the valve controlling the heated air is mounted on a lever pivotally mounted in the housing, and the thermostatic means is a bimetallic element engaging said valve.

5. Temperature control apparatus as defined in claim 3, wherein the valve controlling the atmospheric air opening is mounted on a lever pivotally mounted in the housing, the spring means is a leaf spring and the thermostatic means is a bimetallic element adapted to engage said leaf spring.

6. Temperature control apparatus as defined in claim 4, wherein the bimetallic element is adjustably tensioned.

7. Temperature control apparatus as defined in claim 3, wherein the loading of the spring means is adjustable.

8. Temperature control apparatus as defined in claim 1, wherein the exhaust heated air heater is a hood surrounding the engine's muffler and connected by piping to said housing.

9. In a temperature control apparatus for the intake air of an internal combustion engine, the combination of a housing connected with the air intake of the engine, an exhaust heated air heater for supplying heated air to said housing, a valve controlling the passage of heated air to said housing, thermostatic means controlling the opening and closing of said valve, a passage in said housing open to atmosphere, a valve controlling said last named passage; spring means normally acting to close said last named valve but permitting opening thereof as said first named valve is closed, said valves having mass sufficient to cause the same to function as instantaneous chokes to cause the carburetor to furnish an increased supply of fuel to the engine under suddenly increased loads, said valves being operable by engine suction pressure as determined by the mixture demand of the engine.

References Cited in the file of this patent

UNITED STATES PATENTS

| | | |
|---|---|---|
| 2,058,204 | Ball et al. | Oct. 20, 1936 |
| 2,084,991 | Callahan | June 29, 1937 |
| 2,123,347 | Ware | July 12, 1938 |